United States Patent
You

(10) Patent No.: US 8,693,503 B2
(45) Date of Patent: Apr. 8, 2014

(54) METHOD AND DEVICE FOR OPERATING AND MANAGING MEMORY

(75) Inventor: Bin You, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 142 days.

(21) Appl. No.: 13/501,364

(22) PCT Filed: Apr. 22, 2010

(86) PCT No.: PCT/CN2010/072035
§ 371 (c)(1),
(2), (4) Date: Apr. 11, 2012

(87) PCT Pub. No.: WO2010/145311
PCT Pub. Date: Dec. 23, 2010

(65) Prior Publication Data
US 2012/0201257 A1    Aug. 9, 2012

(30) Foreign Application Priority Data
Oct. 12, 2009  (CN) .......................... 2009 1 0235682

(51) Int. Cl.
*H04J 3/24*    (2006.01)
*H04W 80/00*    (2009.01)
*H04W 28/06*    (2009.01)

(52) U.S. Cl.
CPC .............. *H04W 80/00* (2013.01); *H04W 28/06* (2013.01)
USPC ........................................................ 370/474

(58) Field of Classification Search
CPC .................................................. H04W 80/00
USPC ....................................................... 370/474
See application file for complete search history.

(56) References Cited

U.S. PATENT DOCUMENTS 6,553,006 B1 * 4/2003 Kalliokulju et al. .......... 370/310
2005/0254425 A1 * 11/2005 Suumaki et al. .............. 370/235

FOREIGN PATENT DOCUMENTS

| CN | 1520661 A | 8/2004 |
|---|---|---|
| CN | 1615618 A | 5/2005 |
| CN | 101389144 A | 3/2009 |
| EP | 1453249 A | 9/2004 |

OTHER PUBLICATIONS

International Search Reported dated Jul. 29, 2010 of PCT/CN2010/072035.

* cited by examiner

*Primary Examiner* — Mark Rinehart
*Assistant Examiner* — Maharishi Khirodhar
(74) *Attorney, Agent, or Firm* — Banner & Witcoff, Ltd.

(57) ABSTRACT

A method for operating and managing memory is disclosed in present invention, during the whole transmission process of uplink data in transmission plane protocol layer of General Packet Radio Service (GPRS), only the 1520-bytes global array of Subnet Dependent Convergence Protocol (SNDCP) layer and the 1560-bytes global array of Logic Link Control (LLC) layer are used, so the memory space can be saved effectively; also, because the SNDCP global array is used to store SNDCP data packets and the LLC global array is used to store the LLC data packets, so a dynamic process of memory application releasing on the transmission plane is avoided; moreover, only the data that need to be sent by the LLC are assembled with LLC frame format, thus avoiding useless work of LLC. Moreover, according to the present invention, the memory is operated and managed by way of global array without tedious memory pool operations.

18 Claims, 2 Drawing Sheets

METHOD AND DEVICE FOR OPERATING AND MANAGING MEMORY

TECHNICAL FIELD

The present invention relates operation and management technology of memory, and particularly to a method and an apparatus for operating and managing memory in transmission plane protocol layer of General Packet Radio Service (GPRS).

BACKGROUND OF THE RELATED ART

In a GPRS terminal system, the efficiency of a system and the smoothness of data transmission may be improved by reducing message sending among modules, reducing system calling, and by reasonable memory operation and management. A method for operating and managing memory is provided in the prior art. In the whole of GPRS terminal system, a transmission plane protocol layer mainly comprises a Sub-Network Dependent Convergence Protocol (SNDCP), a Logic Link Control (LLC) and a Radio Link Control (RLC). Wherein, the SNDCP provides a data access function for different types of protocols, and executes operations such as compressing data and control section, data partitioning and data assembling; the LLC provides a stable logic link between a Mobile Station (MS) and a Servicing GPRS Support Node (SGSN), and ensures a reliable transmission of data by a confirmation mechanism, an encryption mechanism; the RLC processes the LLC data packets, and then transmits the packets by a radio interface, and adopts an Auto Repeat Request (ARQ) mechanism for a transmission confirmation.

Only the Message primitives between SNDCP, LLC and RLC are specified in the 3GPP TSS (Third Generation Partnership Project Technical Specification) 44.065, 3GPP TS 44.064 and 3GPP TS44.060, however, a method for operating and managing memory during a process of data transmission is not specified.

An existing most direct method for operating and managing memory comprises, after receiving data sent by an application layer (i.e. uplink data), SNDCP compressing and partitioning the data, and assembling the partitioned data into SNDCP data packets, and storing the SNDCP data packets into the applied memory, and sending the SNDCP data packets to the LLC by the message primitive; the LLC, after receiving the SNDCP data packets, assembling the SNDCP data packets into the LLC data packets, and storing the LLC data packets into the applied memory, and sending it to the RLC by the message primitive; the RLC, after finding the to-be-sent data, starting to apply radio resource, and then sending the data.

The advantage of such method for operating and managing memory is a clear organization, there is no interference among SNDCP, LLC and RLC, data are assembled layer by layer; the method, however, has the following disadvantages:

the first, much memory space is needed, for example in the application layer, at least 3000 bytes of memory is needed to transmit 10000 bytes of data during a process of transmission, if the amount of data increases, the memory size times 3 is actually used;

the second, the application for transmission plane data area memory, the application for control plane data area memory, and the application for message memory when sending message, are all applied to one single memory, therefore, if the amount of data is too large, then the memory for data of the control plane or data for sending the message would not likely to be applied successfully, thus causing that some controls can not be performed normally;

the third, a great deal of data will be accumulated in the RLC, thus increasing the computation amount of the RLC, and thereby decreasing a transmission efficiency of the data;

the fourth, in the LLC, most of data needs to be encrypted, which generally uses a lot of resource, a failure of data transmission will cause the rebuilding of a link of LLC, all the LLC data packets sent to the RLC will be removed, such that the work completed before by the LLC becomes useless.

Moreover, a manner of memory pool also is adopted in the prior art for operating and managing the memory, which can although avoid some disadvantages of above method, but can not avoid a large number of operations such as dynamic memory application releasing and tedious memory pool operations.

SUMMARY OF THE INVENTION

In view of that, a main object of the present invention is to provide a method and an apparatus for operating and managing memory, which can save memory space effectively.

In order to achieve the above object, technical schemes of the present invention are realized by way of:

A method for operating and managing memory, comprising setting a subnet dependent convergence protocol layer (SNDCP) data queue, a SNDCP global array, a logic link control layer (LLC) data queue and a LLC global array; wherein, the method also comprises:

the SNDCP compressing received uplink data, and storing SNDCP parameters obtained by dividing and identifying the compressed uplink data into the SNDCP data queue, and sending a characteristic parameter of the SNDCP data queue obtained after storing the SNDCP parameters to the LLC;

the LLC storing the received characteristic parameter of the SNDCP data queue into the LLC data queue, and sending the characteristic parameter of the LLC data queue after storing the received characteristic parameter of the SNDCP data queue to a radio link control layer (RLC);

the RLC inputting the received characteristic parameter of the LLC data queue to the LLC callback function provided by the LLC, and calling the characteristic parameter of the SNDCP data queue stored by LLC, and then inputting the characteristic parameter of the SNDCP data queue into the SNDCP callback function provided by the SNDCP, and calling the SNDCP parameters;

the SNDCP storing the SNDCP data packets obtained by dividing and assembling the compressed uplink data according to the SNDCP parameters into the SNDCP global array, the LLC obtaining the SNDCP data packets in the SNDCP global array and assembling the SNDCP data packets, and storing LLC data packets obtained by assembling the SNDCP data packets into the LLC global array, the RLC obtaining the LLC data packets in the LLC global array and processing the LLC data packets, and then sending the processed LLC data packets by the applied radio resource.

Wherein, the method further comprises:

when the amount of the to-be-sent data in the RLC exceeds a preset upper limit threshold value, the RLC notifying the SNDCP to suspend sending the SNDCP data packets; and when the amount of the to-be-sent data in the RLC decreases below the upper limit threshold value, the RLC notifying the SNDCP to continue to send the SNDCP data packets.

Wherein, the method further comprises:

the RLC, when receiving the downlink data, assembling the downlink data into the LLC data packets, and storing the LLC data packets into the applied memory, and sending the LLC data packets to the LLC;

the LLC de-assembling the received LLC data packets, and sending a position and a length of the SNDCP data packet obtained by de-assembling in the LLC data packet to the SNDCP.

Wherein, the SNDCP parameters comprise: a segmentation number, a number-protocol data unit, a position of the SNDCP data in the uplink data, and a length of the SNDCP data.

Wherein, the characteristic parameter of the SNDCP data queue is an offset of the SNDCP data in the SNDCP data queue.

Wherein, the characteristic parameter of the LLC data queue may be an offset of the SNDCP data in the LLC data queue.

An apparatus for operating and managing memory, comprising: a setting module, a subnet dependent convergence protocol layer (SNDCP), a logic link control (LLC) and a Radio Link Control (RLC); wherein, the setting module is used to set a SNDCP data queue, a SNDCP global array, a LLC data queue and a LLC global array;

the SNDCP is used to compress the received uplink data, and store SNDCP parameters obtained by dividing and identifying the compressed uplink data into the SNDCP data queue, and send a characteristic parameter of the SNDCP data queue obtained after storing the SNDCP parameters to the LLC;

the LLC is used to store the received characteristic parameter of the SNDCP data queue into the LLC data queue, and send the characteristic parameter of the LLC data queue obtained after storing the received characteristic parameter of the SNDCP data queue to the RLC;

the RLC is used to input the received character parameter of the LLC data queue to the LLC callback function provided by the LLC, and call the characteristic parameter of the SNDCP data queue stored by LLC, and then input the characteristic parameter of the SNDCP data queue to the SNDCP callback function provided by the SNDCP, and call the SNDCP parameters;

the SNDCP is also used to store the SNDCP data packets obtained by dividing and assembling the compressed uplink data according to the SNDCP parameters into the SNDCP global array;

the LLC is also used to obtain the SNDCP data packets in the SNDCP global array and assemble the SNDCP data packets, and store the LLC data packets obtained by assembling the SNDCP data packets into the LLC global array;

the RLC is also used to obtain the LLC data packets in the LLC global array and process the LLC data packets, and then send the processed LLC data packets by the applied radio resource.

Wherein, the RLC is further used to, when the amount of the to-be-sent data in the RLC exceeds a preset upper limit threshold value, notify the SNDCP to suspend sending the SNDCP data packets; when the amount of the to-be-sent data in the RLC decreases below the upper limit threshold value, notify the SNDCP to continue to send the SNDCP data packets.

Wherein, the RLC is further used to, when receiving downlink data, assemble the downlink data into the LLC data packets, and store the packets into the applied memory, and then send the packets to the LLC; the LLC is further used to, de-assemble the received LLC data packets, and send the position and length of the SNDCP data packet obtained by de-assembling the LLC data packets in the LLC data packet to the SNDCP.

Wherein, the SNDCP parameters comprise: a segmentation number, a Number-Protocol Data Unit (N-PDU), a position of the SNDCP data in the uplink data, and a length of the SNDCP data; the characteristic parameter of the SNDCP data queue is an offset of the SNDCP data in the SNDCP data queue; the characteristic parameter of the LLC data queue is an offset of the SNDCP data in the LLC data queue.

It can be seen from the above technical scheme that, during a whole transmission process of uplink data of GPRS transmission plane protocol layer, only a 1520-byte SNDCP global array and a 1560-byte LLC global array are used, thus saving memory space effectively; also, because the SNDCP global array is used to store the SNDCP data packets and the LLC global array is used to store the LLC data packets, so a dynamic process of memory application releasing on the transmission plane is avoided; moreover, only the data that need to be sent by the LLC are assembled with LLC frame format, thus avoiding useless work of LLC; further, the throughput of uplink data is guaranteed by controlling the amount of the accumulated data which are to be sent by LLC with a preset upper limit threshold value. In addition, the memory is operated and managed by way of global array without tedious memory pool operations according to the present invention.

PREFERRED EMBODIMENTS OF THE PRESENT INVENTION

Technical schemes of according to the present invention will be further described in detail in combination with drawings and specific embodiments.

Before executing the method for operating and managing memory according to the present invention, an SNDCP data queue array and an SNDCP global array, an LLC data queue and an LLC global array are set at first.

Wherein, because the maximum size of SNDCP data specified by 3GPP TS 44.064 is 1520 bytes, then the size of an SNDCP global array is set as 1520 bytes; moreover, because the maximum size of LLC data specified by 3GPP TS 44.064 is 1560 bytes, then the size of an LLC global array is set as 1560 bytes.

Moreover, the roles of a data queue and a global array will be described hereafter, which will not be repeated herein.

Figure 1:
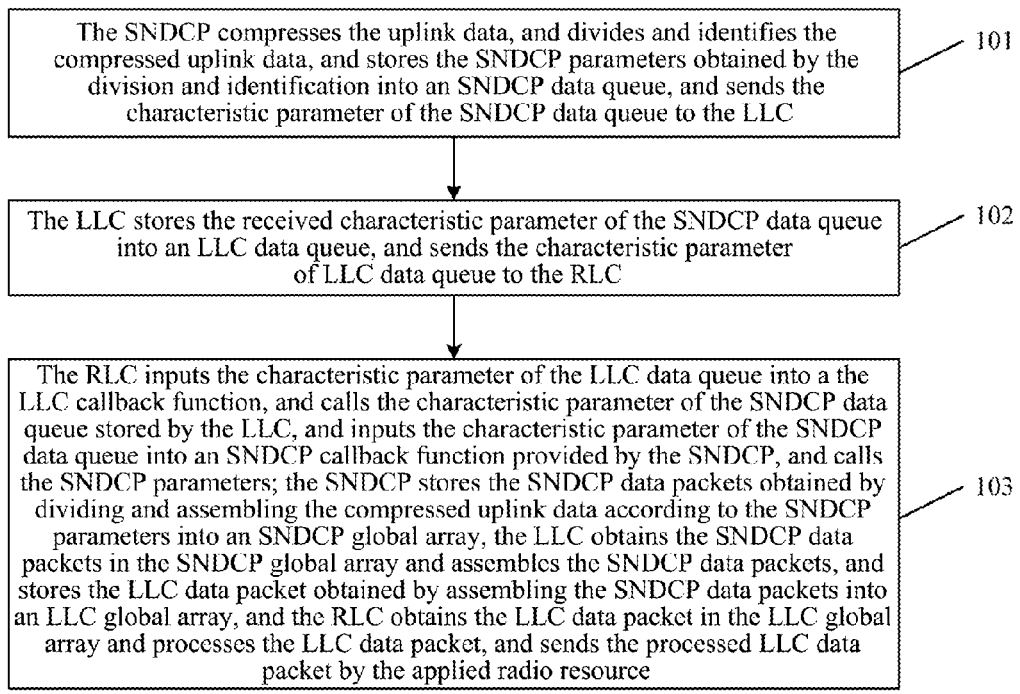
FIG. 1 is a flowchart of a method for operating and managing memory according to the present invention.

Next, as shown in FIG. 1, a method for operating and managing memory according to the present invention comprises the following steps.

In step 101, the SNDCP compresses the received uplink data, and divides and identifies the compressed uplink data according to N201-U or N201-I, and stores the divided and identified SNDCP into a set SNDCP data array, and sends the characteristic parameter of the SNDCP data queue obtained by storing the SNDCP parameters to the LLC.

Wherein, the uplink data refer to data sent to the SNDCP by the application layer. Moreover, the application layer sends data in form of data packet, therefore, the SNDCP not only compresses a data part of the data packets, but also compress a control part of the data packets, which belongs to the existing technology and thus will not be repeated herein.

Wherein, N201-U refers to a maximum information field length of a U frame and an Unnumbered Information (UI) frame, and N201-I refers to a maximum information field length of I frame.

Wherein, the division and identification of the compressed uplink data means to emphaamount that the compressed uplink data will not be divided practically.

Wherein, the SNDCP parameters comprise: a segmentation number, a Number-Protocol Data Unit (N-PDU), a position of each segment of data after divided and identified by the SNDCP in an original data (i.e. the received uplink data), and a length of each segment of data after divided and identified by the SNDCP. For the purpose of brief description, each segment of data after divided and identified by the SNDCP is called as SNDCP data.

Wherein, the characteristic parameter of the SNDCP data queue is an offset of the SNDCP data in the SNDCP data queue.

Moreover, the characteristic parameter of the SNDCP data queue is included in a logic link acknowledged data request (LL_DATA_REQ) message or in a logic link unacknowledged data request (LL_UNIDATA_REQ) message and sent to the LLC by the SNDCP.

In step 102, the LLC stores the characteristic parameter of SNDCP data queue into a set LLC data queue, and sends characteristic parameter of LLC data queue obtained after storing the characteristic parameter of SNDCP data queue to the RLC.

Wherein, the characteristic parameter of the LLC data queue is an offset of the SNDCP data in the LLC data queue. It should be noted that, here the LLC data are not assembled with LLC frame format, wherein the LLC data refer to data obtained by adding the LLC packet head and LLC packet tail to the SNDCP data.

Moreover, the characteristic parameter of the LLC data queue is included in a radio link layer acknowledged data request (RLC_DATA_REQ) message or a radio link layer unacknowledged data request (RLC_UNIDATA_REQ) message, and sent to the RLC by the LLC.

In step 103, the RLC stores the received character parameter of the LLC data queue, and applies for a radio resource, after the radio resource is obtained, the RLC inputs the characteristic parameter of the LLC data queue in a the LLC callback function provided by the LLC, and calls the characteristic parameter of the SNDCP data queue stored by the LLC, and inputs the characteristic parameter of the SNDCP data queue into a SNDCP callback function provided by SNDCP, and calls a SNDCP parameter;

the SNDCP stores the SNDCP data packets obtained by dividing and assembling the compressed uplink data according to the SNDCP parameter into a set SNDCP global array, and then returns a pointer of the SNDCP global array to the LLC, the LLC obtains the SNDCP data packets in the SNDCP global array according to the pointer of the SNDCP global array and assembles the SNDCP data packets with LLC frame format, and stores the LLC data packets obtained by assembling into a set LLC global array, and returns a pointer of the LLC global array to the RLC, and the RLC obtains the LLC data packets in the LLC global array according to the pointer of the LLC global array and processes the LLC data packets, and sends the processed LLC data packets by the applied radio resource.

Wherein, the RLC inputs the stored characteristic parameter of the LLC data queue into the LLC callback function provided by the LLC in order to obtain the LLC data packets, however at the present time, there is no SNDCP data packet in the LLC, so the LLC should input the stored characteristic parameter of the SNDCP data queue into the SNDCP callback function provided by the SNDCP to obtain the SNDCP data packets, and assemble the SNDCP data packets into LLC data packets. Moreover, during the process of assembling the SNDCP data packets into the LLC data packets, operations such as computation check and encryption are also executed, which belongs to the existing technology and will not be repeated herein.

The method for operating and managing memory according to the present invention also comprises the following steps:

When the amount of the to-be-sent data in the RLC exceeds a preset upper limit threshold value, the RLC notifies the SNDCP to suspend sending SNDCP data packets; when the amount of the to-be-sent data in the RLC decreases below the upper limit threshold value, the RLC notifies the SNDCP to continue to send the SNDCP data packets.

Wherein, the RLC notifies the SNDCP to suspend sending the SNDCP data packets by sending a logic link control layer_subnet dependent convergence protocol layer_suspend_indication (LLC_SNDCP_SUSPEND_IND) message. After the RLC sends the accumulated data for a period of time, and when the to-be-sent data in the RLC decreases below the upper limit threshold value, the RLC notifies the SNDCP to continue to send the SNDCP data packets by sending logic link control layer_subnet dependent convergence protocol layer_resume_indication (LLC_SNDCP_RESUME_IND) message. And thus, for the RLC, the sending rate is relatively smooth because the amount of the to-be-sent data is controlled within a certain range.

The method for operating and managing memory also comprises the following steps:

When the RLC receives downlink data, assembling the downlink data into LLC data packets, and stores it into the applied memory and sends it to the LLC;

the LLC de-assembling the received LLC data packets, and sends the position and length of the SNDCP data packet in the LLC data packet obtained by de-assembling to the SNDCP.

Wherein, the downlink data refers to the data sent to the RLC by network side.

For a transmission of the downlink data in the GPRS transmission plane protocol layer, because the data transmitted by each message is assembled in a frame format in a target layer, if the processing is performed according to the way for processing the uplink data, as calling the callback function for each other, then the complexity and error ratio will increase, which is not worthy to do so. Therefore, the steps of processing the transmission of the downlink data based on the above process should specifically comprise:

the RLC assembling the received downlink data into LLC data packets in a LLC frame format, and storing it into the applied memory, and then sending it to the LLC by logic link layer_acknowledged-data_indication (RLC_DATA_IND) message or logic link layer_unacknowledged-data_indication (RLC_UNDATA_IND) message;

the LLC de-assembling the received LLC data packets in the LLC frame format to obtain the position and length of the SNDCP data packet in the LLC data packet; here, the LLC will not re-apply memory space, but send the position and length of the SNDCP data packet in the LLC data packet obtained by de-assembling to the SNDCP, and the SNDCP obtaining the SNDCP data from the memory applied by the RLC according to the position and length of the SNDCP data packet in the LLC data packet.

Figure 2:
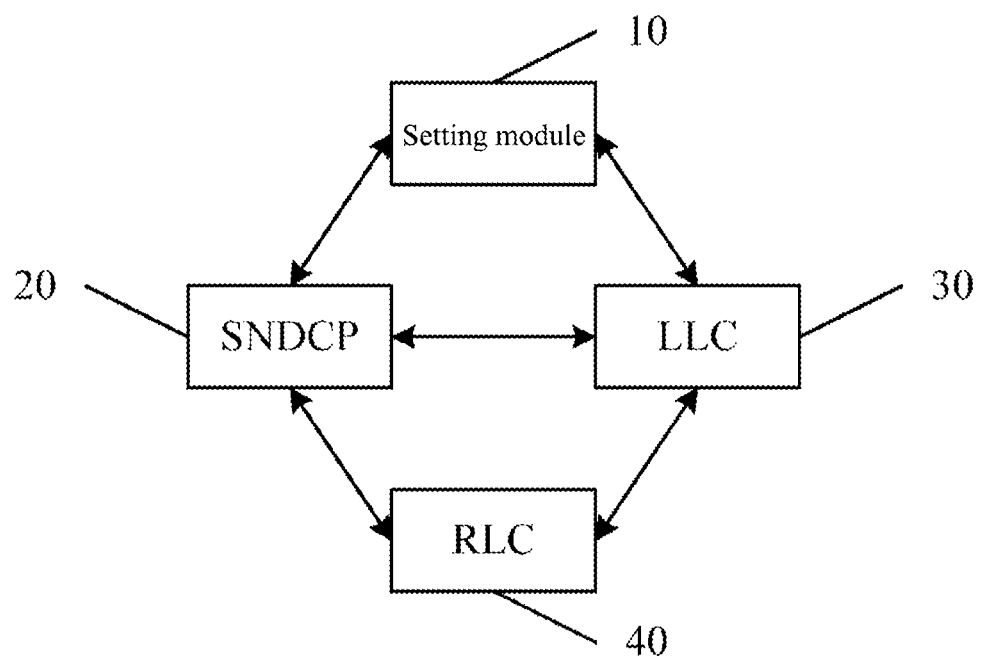
FIG. 2 is a schematic diagram of a structure of an apparatus for operating and managing memory according to the present invention.

In order to realize the above method, the present invention correspondingly provides an apparatus for operating and managing memory, as shown in FIG. 2, the apparatus comprises: a setting module 10, an SNDCP 20, an LLC 30 and an RLC 40; wherein, the setting module 10 is configured to set an SNDCP data queue, an SNDCP global array, an LLC data queue and an LLC global array;

the SNDCP 20 is used to compress the received uplink data, and store SNDCP parameters obtained by dividing and identifying the compressed uplink data into the SNDCP data queue, and send a characteristic parameter of the SNDCP data queue obtained after storing the SNDCP parameters to the LLC 30;

the LLC 30 is used to store the received characteristic parameter of the SNDCP data queue into the LLC data queue, and send the characteristic parameter of the LLC data queue obtained after storing the SNDCP data queue to the RLC 40;

the RLC 40 is used to input the received character parameter of the LLC data queue to the LLC callback function provided by the LLC 30, and call the characteristic parameter of the SNDCP data queue stored by LLC 30, and then input the characteristic parameter of the SNDCP data queue to the SNDCP callback function provided by the SNDCP 20, and call the SNDCP parameters;

the SNDCP 20 is also used to store the SNDCP data packets obtained by dividing and compressing the compressed uplink data according the SNDCP parameters into the SNDCP global array;

the LLC 30 is also used to obtain the SNDCP data packets in the SNDCP global array and assemble the SNDCP data packets, and store the LLC data packets obtained by assembling into the LLC global array;

the RLC 40 is also used to obtain the LLC data packets in the LLC global array and process the LLC data packets, and then send it by the applied radio resource.

Wherein, the RLC 40 is further used to, when the amount of to-be-sent data in the RLC 40 exceeds a preset upper limit threshold value, notify the SNDCP 20 to suspend sending the SNDCP data packets; when the amount of the to-be-sent data in the RLC 40 decreases below the upper limit threshold value, notify the SNDCP 20 to continue to send the SNDCP data packets.

Wherein the RLC 40 is further used to, when receiving the downlink data, assemble the downlink data into the LLC data packets, and store it into the applied memory, and then send it to the LLC 30; the LLC 30 is further used to, de-assemble the received LLC data packets, and send the position and length of the SNDCP data packet in the LLC data packet obtained by de-assembling to the SNDCP.

Wherein, the SNDCP parameter may be: a segmentation number, a position of the SNDCP data in the uplink data, and a length of the SNDCP data.

Wherein, the characteristic parameter of the SNDCP data queue is an offset of the SNDCP data in the SNDCP data queue.

Wherein, the characteristic parameter of the LLC data queue may be an offset of the SNDCP data in the LLC data queue.

To summarize, during a whole transmission process of uplink data of GPRS transmission plane protocol layer, only the 1520-byte SNDCP global array and the 1560-byte LLC global array are used, thus saving memory space effectively; also, because the SNDCP global array is used to store the SNDCP data packets and the LLC global array is used to store the LLC data packets, so a dynamic process of memory application releasing on the transmission plane is avoided; moreover, only the data that need to be sent by the LLC are assembled with LLC frame format, thus avoiding useless work of LLC; further, the throughput of uplink data is guaranteed by controlling the amount of the accumulated data which are to be sent by LLC with a preset upper limit threshold value. In addition, the memory is operated and managed by way of global array without tedious memory pool operations according to the present invention.

What are described above are only preferred embodiments of the present invention, which are not used to limit the protection scope of the present invention.

What is claimed is:

1. A method for operating and managing memory, comprising setting a subnet dependent convergence protocol layer (SNDCP) data queue, a SNDCP global array, a logic link control layer (LLC) data queue and a LLC global array; wherein, the method also comprises:

the SNDCP compressing received uplink data, and storing SNDCP parameters obtained by dividing and identifying the compressed uplink data into the SNDCP data queue, and sending a characteristic parameter of the SNDCP data queue obtained after storing the SNDCP parameters to the LLC;

the LLC storing the received characteristic parameter of the SNDCP data queue into the LLC data queue, and sending a characteristic parameter of the LLC data queue obtained after storing the received characteristic parameter of the SNDCP data queue to a radio link control layer (RLC);

the RLC inputting the received characteristic parameter of the LLC data queue to an LLC callback function provided by the LLC, and calling the stored characteristic parameter of the SNDCP data queue stored by the LLC, and then inputting the characteristic parameter of the SNDCP data queue into the SNDCP callback function provided by the SNDCP, and calling the SNDCP parameters;

the SNDCP storing SNDCP data packets obtained by dividing and assembling the compressed uplink data according to the SNDCP parameters into the SNDCP global array, the LLC obtaining the SNDCP data packets in the SNDCP global array and assembling the SNDCP data packets, and storing LLC data packets obtained by assembling the SNDCP data packets into the LLC global array, the RLC obtaining the LLC data packets in the LLC global array and processing the LLC data packets, and then sending the processed LLC data packets by an applied radio resource.

2. The method for operating and managing memory according to claim 1, further comprising:

when an amount of to-be-sent data in the RLC exceeds a preset upper limit threshold value, the RLC notifying the SNDCP to suspend sending the SNDCP data packets; and when the amount of the to-be-sent data in the RLC decreases below the upper limit threshold value, the RLC notifying the SNDCP to continue to send the SNDCP data packets.

3. The method for operating and managing memory according to claim 1, further comprising:

the RLC, after receiving downlink data, assembling the downlink data into the LLC data packets, and storing the LLC data packets into applied memory, and sending the LLC data packets to the LLC;

the LLC de-assembling the received LLC data packets, and sending a position and a length of the SNDCP data packet in the LLC data packet obtained by de-assembling to the SNDCP.

4. The method for operating and managing memory according to claim 1, wherein, the SNDCP parameters comprise: a segmentation number, a Number-Protocol Data Unit (N-PDU), a position of the SNDCP data in the uplink data, and a length of the SNDCP data.

5. The method for operating and managing memory according to claim 1, wherein,
the characteristic parameter of the SNDCP data queue is an offset of the SNDCP data in the SNDCP data queue.

6. The method for operating and managing memory according to claim 1, wherein,
the characteristic parameter of the LLC data queue is an offset of the SNDCP data in the LLC data queue.

7. An apparatus for operating and managing memory, comprising: a processor, a subnet dependent convergence protocol layer (SNDCP), a logic link control layer (LLC) and a Radio Link Control (RLC); wherein,
the processor is configured to set a SNDCP data queue, a SNDCP global array, a LLC data queue and a LLC global array;
the SNDCP is used to compress received uplink data, and store SNDCP parameters obtained by dividing and identifying the compressed uplink data into the SNDCP data queue, and send a characteristic parameter of the SNDCP data queue obtained after storing the SNDCP parameters to the LLC;
the LLC is used to store a received characteristic parameter of the SNDCP data queue into the LLC data queue, and send the characteristic parameter of the LLC data queue obtained after storing the characteristic parameter of the SNDCP data queue to the RLC;
the RLC is used to input a received character parameter of the LLC data queue to the LLC callback function provided by the LLC, and call the characteristic parameter of the SNDCP data queue stored by the LLC, and then input the characteristic parameter of the SNDCP data queue to the SNDCP callback function provided by the SNDCP, and call the SNDCP parameters;
the SNDCP is also used to store SNDCP data packets obtained by dividing and assembling the compressed uplink data according to the SNDCP parameters into the SNDCP global array;
the LLC is also used to obtain the SNDCP data packets in the SNDCP global array and assemble the SNDCP data packets, and store LLC data packets obtained by assembling the SNDCP data packets into the LLC global array;
the RLC is also used to obtain the LLC data packets in the LLC global array and process the LLC data packets, and then send the processed LLC data packets by an applied radio resource.

8. The apparatus for operating and managing memory according to claim 7, wherein, the RLC is further used to, when an amount of to-be-sent data in the RLC exceeds a preset upper limit threshold value, notify the SNDCP to suspend sending the SNDCP data packets; when the amount of the to-be-sent data in the RLC decreases below the upper limit threshold value, notify the SNDCP to continue to send the SNDCP data packets.

9. The apparatus for operating and managing memory according to claim 7, wherein, the RLC is further used to, when receiving downlink data, assemble the downlink data into the LLC data packets, and store the LLC data packets into applied memory to send to the LLC;
the LLC is further used to, de-assemble the received LLC data packets, and send a position and a length of the SNDCP data packet obtained by de-assembling the LLC data packet in the LLC data packet to the SNDCP.

10. The apparatus for operating and managing memory according to claim 7, wherein, the SNDCP parameters comprise: a segmentation number, a Number-Protocol Data Unit (N-PDU), a position of the SNDCP data in the uplink data, and a length of the SNDCP data; the characteristic parameter of the SNDCP data queue is an offset of the SNDCP data in the SNDCP data queue; the characteristic parameter of the LLC data queue is an offset of the SNDCP data in the LLC data queue.

11. The method for operating and managing memory according to claim 2, wherein, the SNDCP parameters comprise: a segmentation number, a Number-Protocol Data Unit (N-PDU), a position of the SNDCP data in the uplink data, and a length of the SNDCP data.

12. The method for operating and managing memory according to claim 3, wherein, the SNDCP parameters comprise: a segmentation number, a Number-Protocol Data Unit (N-PDU), a position of the SNDCP data in the uplink data, and a length of the SNDCP data.

13. The method for operating and managing memory according to claim 2, wherein,
the characteristic parameter of the SNDCP data queue is an offset of the SNDCP data in the SNDCP data queue.

14. The method for operating and managing memory according to claim 3, wherein,
the characteristic parameter of the SNDCP data queue is an offset of the SNDCP data in the SNDCP data queue.

15. The method for operating and managing memory according to claim 2, wherein,
the characteristic parameter of the LLC data queue is an offset of the SNDCP data in the LLC data queue.

16. The method for operating and managing memory according to claim 3, wherein,
the characteristic parameter of the LLC data queue is an offset of the SNDCP data in the LLC data queue.

17. The apparatus for operating and managing memory according to claim 8, wherein, the SNDCP parameters comprise: a segmentation number, a Number-Protocol Data Unit (N-PDU), a position of the SNDCP data in the uplink data, and a length of the SNDCP data; the characteristic parameter of the SNDCP data queue is an offset of the SNDCP data in the SNDCP data queue; the characteristic parameter of the LLC data queue is an offset of the SNDCP data in the LLC data queue.

18. The apparatus for operating and managing memory according to claim 9, wherein, the SNDCP parameters comprise: a segmentation number, a Number-Protocol Data Unit (N-PDU), a position of the SNDCP data in the uplink data, and a length of the SNDCP data; the characteristic parameter of the SNDCP data queue is an offset of the SNDCP data in the SNDCP data queue; the characteristic parameter of the LLC data queue is an offset of the SNDCP data in the LLC data queue.

* * * * *